(12) United States Patent
Spatafora et al.

(10) Patent No.: US 6,186,313 B1
(45) Date of Patent: Feb. 13, 2001

(54) METHOD AND UNIT FOR TRANSFERRING A GROUP OF CIGARETTES CONTINUOUSLY BETWEEN CONVEYORS

(75) Inventors: Mario Spatafora; Fabrizio Tale', both of Bologna (IT)

(73) Assignee: G.D Societa' per Azioni, Bologna (IT)

( * ) Notice: Under 35 U.S.C. 154(b), the term of this patent shall be extended for 0 days.

(21) Appl. No.: 09/262,442

(22) Filed: Mar. 4, 1999

(30) Foreign Application Priority Data

Mar. 5, 1998 (IT) .............................................. BO98A0127

(51) Int. Cl.[7] .................................................. B65G 29/00
(52) U.S. Cl. ...................................... 198/474.1; 198/476.1
(58) Field of Search ........................... 198/474.1, 477.1, 198/478.1, 484.1, 608, 803.1, 476.1

(56) References Cited

U.S. PATENT DOCUMENTS

| 2,822,653 | * | 2/1958 | Zinn et al. |  |
|---|---|---|---|---|
| 3,977,157 | * | 8/1976 | Davies et al. | 53/207 |
| 4,394,899 | * | 7/1983 | Fluck | 198/408 |
| 4,559,757 | * | 12/1985 | Focke et al. | 53/176 |
| 4,823,934 | * | 4/1989 | Lemaire et al. | 198/470.1 |
| 4,866,912 | * | 9/1989 | Deutsch | 53/449 |
| 4,938,341 | * | 7/1990 | Bogatzki | 198/474.1 |
| 5,199,547 | * | 4/1993 | Boldrini et al. | 198/463.2 |
| 5,267,577 | * | 12/1993 | Rizzoli et al. | 131/94 |
| 5,400,566 | * | 3/1995 | Ghini et al. | 53/387.2 |
| 5,442,894 | * | 8/1995 | Ogata et al. | 53/234 |
| 5,465,952 | * | 11/1995 | Eberle et al. | 271/204 |
| 5,509,525 | * | 4/1996 | Watanabe | 198/474.1 |
| 5,551,334 | * | 9/1996 | Cody | 99/470 |
| 5,697,490 | * | 12/1997 | Raque | 198/803.9 |
| 5,699,893 | * | 12/1997 | Spada | 198/478.1 |
| 5,806,289 | * | 9/1998 | Sassi et al. | 53/575 |
| 5,927,473 | * | 7/1999 | Draghetti | 198/474.1 |
| 5,941,367 | * | 8/1999 | Osti et al. | 198/475.1 |
| 5,996,318 | * | 12/1999 | Draghetti | 53/466 |
| 6,023,909 | * | 2/2000 | Boldrini | 53/234 |

FOREIGN PATENT DOCUMENTS

| 0 295 557 | 12/1988 | (EP) . |
| 0 548 978 A1 | 6/1993 | (EP) . |
| 1 203 259 | 8/1970 | (GB) . |

* cited by examiner

Primary Examiner—James R. Bidwell
(74) Attorney, Agent, or Firm—Marshall, O'Toole, Gerstein, Murray & Borun

(57) ABSTRACT

A method and unit continously transferring a group of cigerettes between conveyers, whereby the group of cigarettes is formed in a first seat on a group-forming first conveyor, and is fed by the first conveyor to a transfer station where the longitudinal ends of the group are engaged by a movable seat, which is moved with respect to the first seat to transfer the group from the first seat to a second seat on a wrapping conveyor.

22 Claims, 6 Drawing Sheets

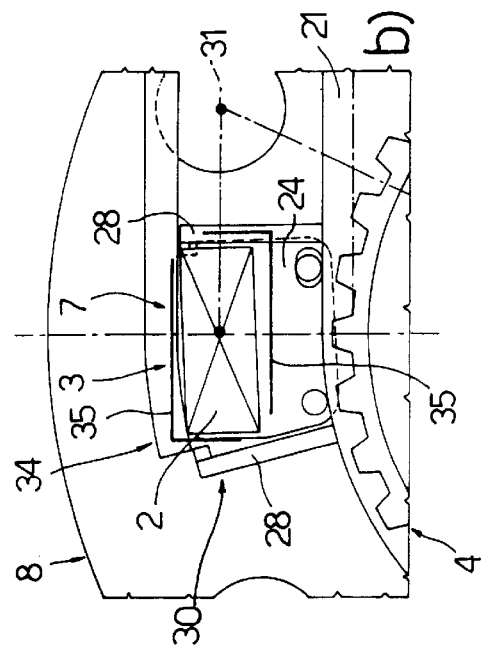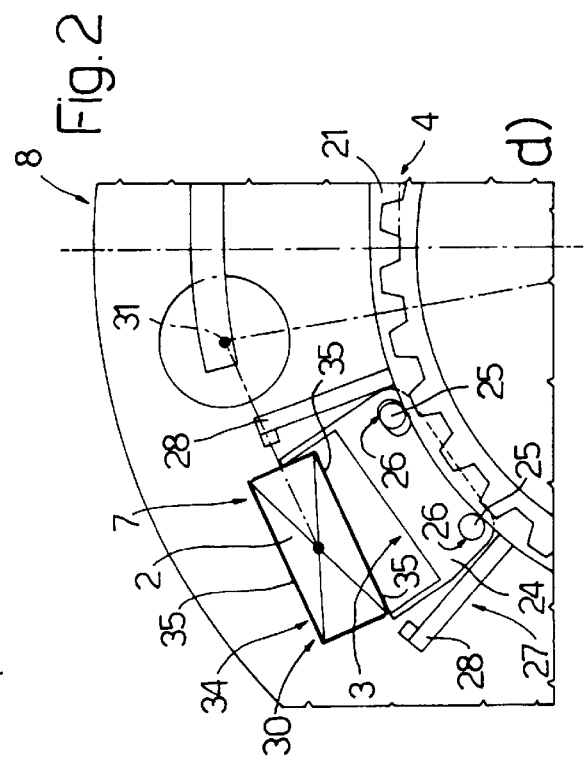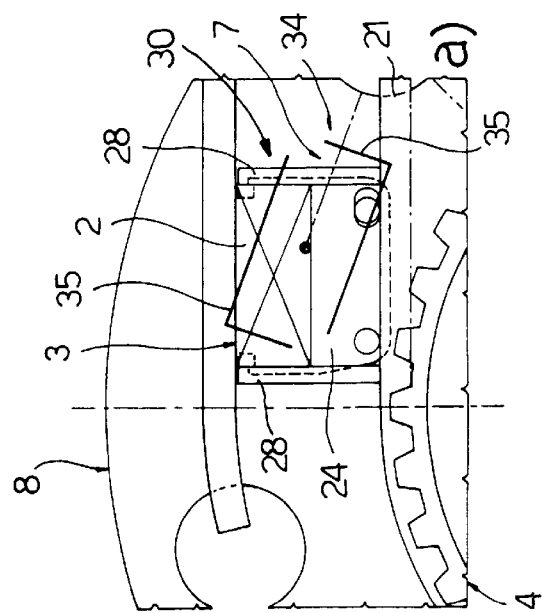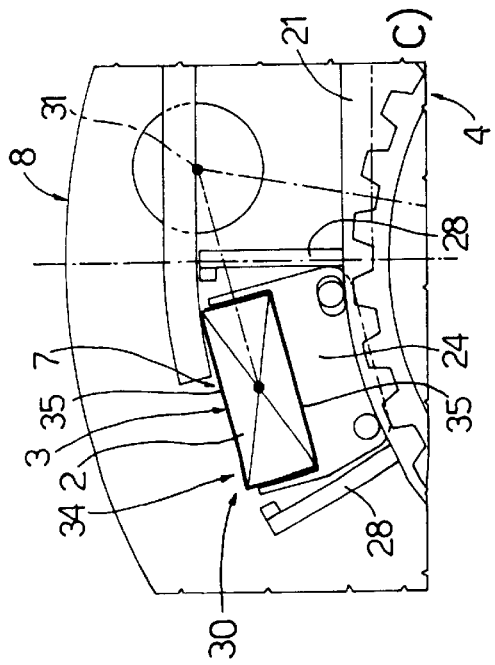
Fig. 2

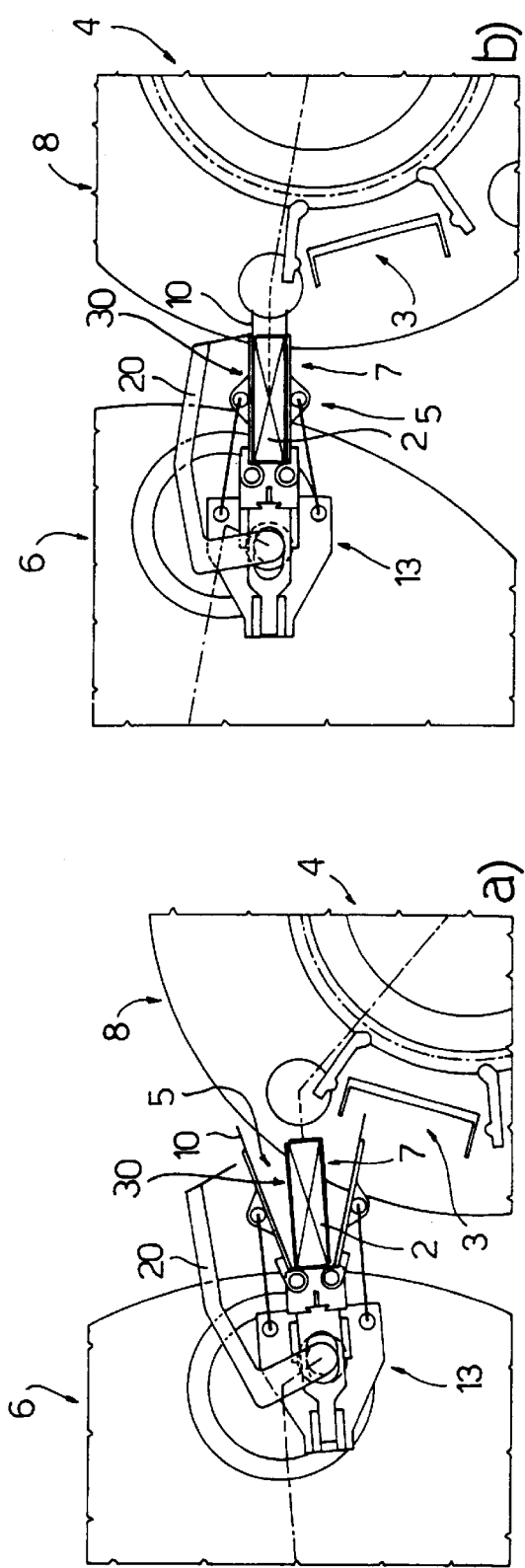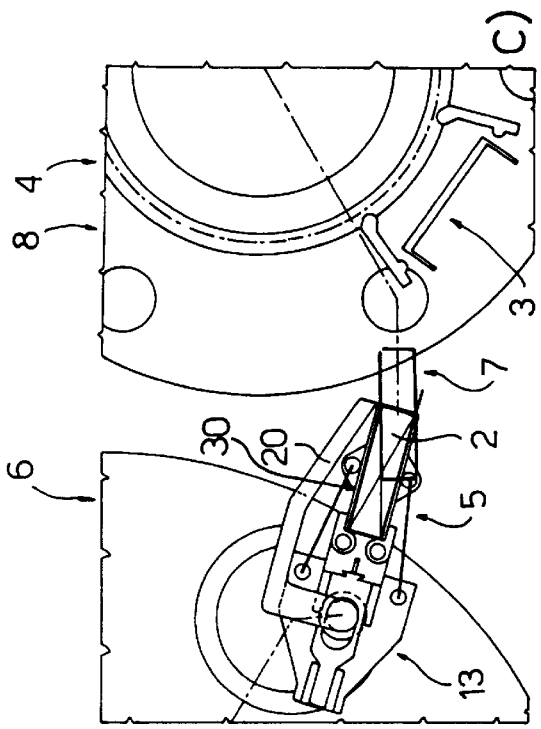
Fig.3

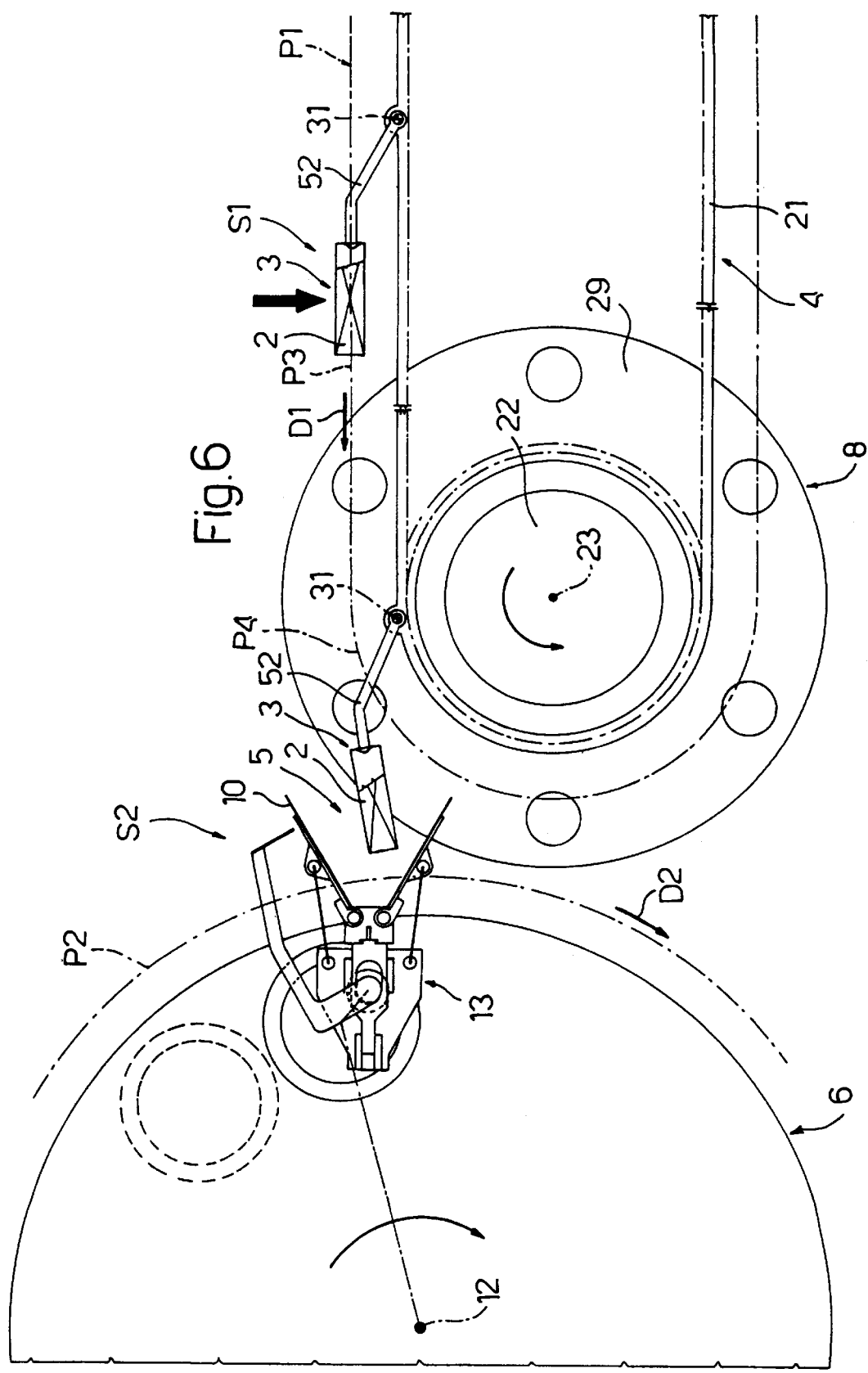

METHOD AND UNIT FOR TRANSFERRING A GROUP OF CIGARETTES CONTINUOUSLY BETWEEN CONVEYORS

The present invention relates to a method of transferring a group of cigarettes continuously between conveyors.

More specifically, the present invention relates to a method of continuously transferring a group of cigarettes from a seat on a continuous supply conveyor to a corresponding seat on a continuous wrapping conveyor or wheel.

Here and hereinafter, the term "group of cigarettes" is intended to mean a number of cigarettes arranged in a number of layers with no outer sheet of wrapping material, i.e. a number of cigarettes which, to remain together, need some sort of outer retaining wrapping.

BACKGROUND OF THE INVENTION

In known units for transferring a group of cigarettes from a seat on a continuous supply conveyor to a corresponding seat on a continuous wrapping wheel, as described for example in British Patent No. 1,203,259, the supply conveyor is normally defined by a chain or belt conveyor, the seats of which are fed along a path having one portion—hereinafter referred to as the "transfer portion" —which reproduces a portion of the circular path along which the seats on the wrapping wheel are fed. Along the transfer portion, the seats on the supply conveyor are moved in time, and maintained coaxial, with the corresponding seats on the wrapping wheel to transfer the group of cigarettes axially between two corresponding coaxial seats.

Axial transfer involves several drawbacks by subjecting the group of cigarettes to fairly severe mechanical stress (especially on modern packing machines capable of producing over ten packets a second) which may result in deformation of the cigarettes or tobacco fallout.

Axial transfer also requires that the supply conveyor and wrapping wheel be positioned side by side, i.e. in two different planes, which therefore increases the overall depth of the transfer unit and complicates control and maintenance.

Finally, the need for a common path portion defined by said transfer portion—between the wrapping wheel and the supply conveyor makes for a highly rigid arrangement of the conveyors, and calls for an extremely long and therefore bulky, high-cost chain or belt, as shown clearly by the device described in British Patent No. 1,203,259. A shorter chain or belt may be used, but only on condition that it be fed along a much more tightly curving path, thus subjecting the chain or belt to extremely severe mechanical stress.

EP Patent No. 548,978 discloses a unit for continuously transferring a group of cigarettes between relevant seats of two wrapping wheels. At a given transfer zone the seats on the two wheels are maintained facing and parallel to each other and to a fixed direction—in particular, a direction perpendicular to the respective axes of rotation of the wheels—by moving, in particular oscillating, the seats continuously with respect to the respective wheels.

SUMMARY OF THE INVENTION

It is an object of the present invention to provide a method of continuously transferring a group of cigarettes, designed to eliminate the aforementioned drawbacks, and which in particular is straightforward and cheap to implement.

According to the present invention, there is provided a method of transferring a group of cigarettes continuously between conveyors, the method comprising a conveying step wherein said group is fed, by means of a first conveyor traveling continuously in a first direction, along a first path comprising an initial straight loading portion and a final transfer portion; and a transfer step wherein said group is transferred, as the group travels along said transfer portion, from said first conveyor to a second conveyor traveling continuously in a second direction along a second path; the method being characterized in that said first path and said second path are coplanar; said transfer step being performed by housing the group, at least as the group is fed along said transfer portion, inside a movable seat, which is fed by said first conveyor at least along said transfer portion, and is simultaneously moved, with respect to said first conveyor and as the movable seat travels along the transfer portion, between a first position along said first path and a second position along said second path, so as to effect a rotation of said group to enable the group to travel along said straight loading portion and said second path with two respective different orientations with respect to said first direction and said second direction respectively; said two orientations being substantially at 90° to each other.

The present invention also relates to a unit for transferring a group of cigarettes continuously between conveyors.

According to the present invention, there is provided a unit for transferring a group of cigarettes continuously between conveyors, the unit comprising a first conveyor for feeding said group continuously and in a first direction along a first path comprising an initial straight loading portion and a final transfer portion; a second conveyor for feeding said group continuously and in a second direction along a second path; and transfer means acting along said transfer portion to transfer said group from the first conveyor to the second conveyor; characterized in that said first path and said second path are coplanar; said transfer means comprising a movable seat for housing the group and which is fed by said first conveyor at least along said transfer portion; and actuating means for moving said movable seat, with respect to the first conveyor and as the movable seat is fed along said transfer portion, between a first position along said first path and a second position along said second path to effect a rotation of said group to enable the group to travel along said straight loading portion and said second path with two respective different orientations with respect to said first direction and said second direction respectively; said two orientations being substantially at 90° to each other.

BRIEF DESCRIPTION OF THE DRAWINGS

A number of non-limiting embodiments of the present invention will be described by way of example with reference to the accompanying drawings, in which:

FIG. 2 shows a schematic front view of a first detail of the FIG. 1 unit in different operating positions;

FIG. 3 shows a larger-scale schematic front view of a second detail of the FIG. 1 unit in different operating positions;

FIG. 6 shows a schematic front view of a second embodiment of the unit according to the present invention.

DETAILED DESCRIPTION OF THE INVENTION

Figure 1:
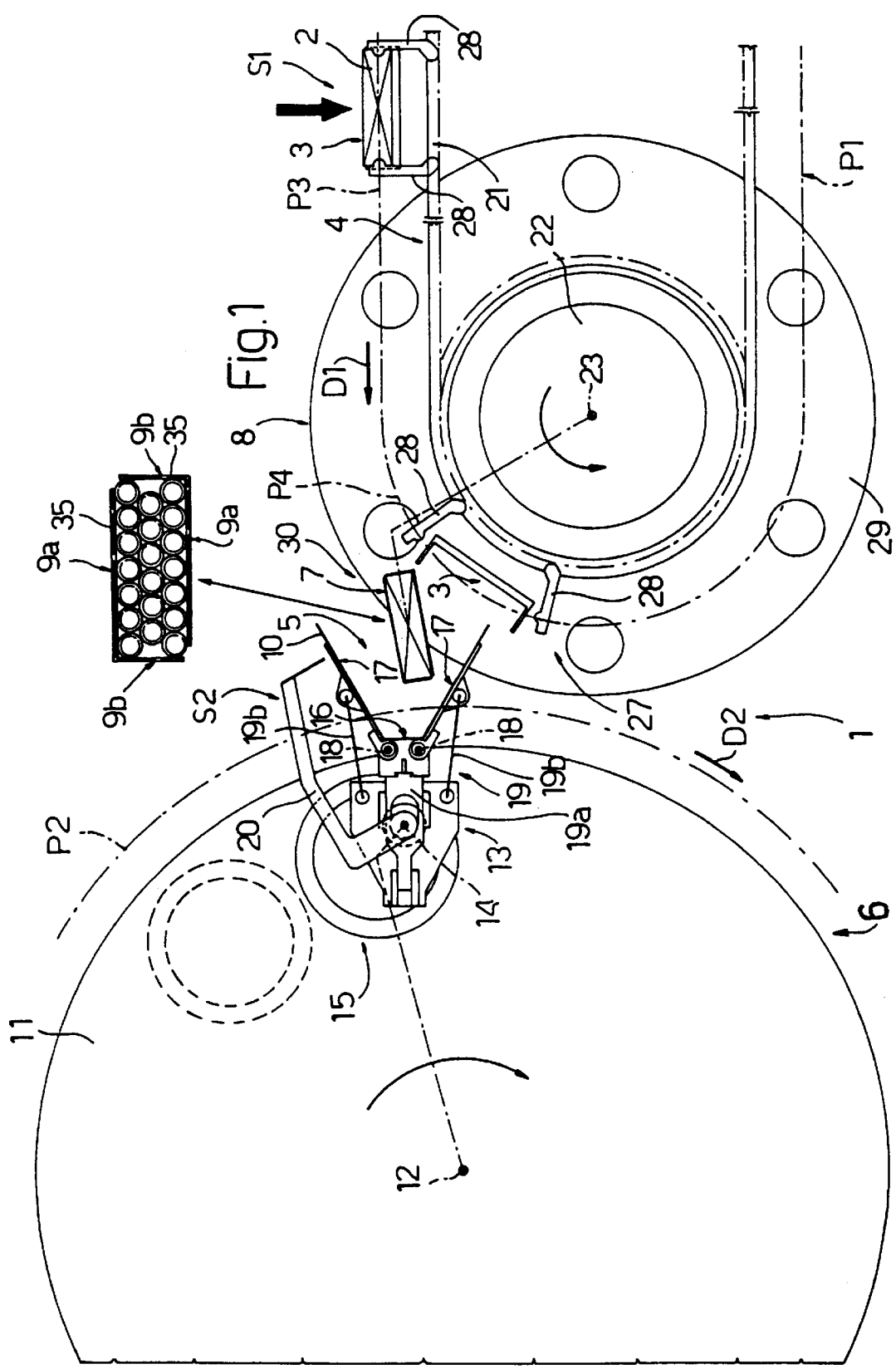
FIG. 1 shows a schematic front view of a first preferred embodiment of the unit according to the present invention.

Number 1 in FIG. 1 indicates as a whole a transfer unit forming part of a continuous automatic packing machine for producing packets of cigarettes not shown. On unit 1, a group 2 of cigarettes is formed (in known manner not shown) inside a respective seat 3 fed continuously and a direction Di along a path Pi by an endless forming conveyor 4, and is then transferred to a corresponding seat 5 fed continuously and in a direction D2 along a path P2 by an endless wrapping conveyor defined by a wrapping wheel 6.

Path P1 is coplanar with path P2, and comprises an initial loading portion P3 at a loading station S1, and a final transfer portion P4 at a transfer station S2 where the group 2 of cigarettes is transferred by a seat 7 carried by a transmission pulley 8 of conveyor 4. Seat 7 is a movable seat for receiving group 2 from seat 3 on forming conveyor 4 and feeding group 2 to the corresponding seat 5 on wrapping wheel 6.

At transfer station S2, pulley 8 feeds each seat 7 along a path substantially coincident with transfer portion P4 of path P1.

Group 2 is confined within a substantially parallelepiped space defined by a pair of parallel large lateral surfaces 9a, and by a pair of parallel small lateral surfaces 9b perpendicular to surfaces 9a. As shown more clearly in FIG. 4, said space also comprises two opposite longitudinal ends 9c, and a central portion 9d interposed between the two longitudinal ends 9c.

Along loading portion P3 of path P1, group 2 is conveyed by forming conveyor 4 with a first orientation with respect to direction D1, and wherein small lateral surfaces 9b are substantially perpendicular to direction D1; and along path P2, group 2 is conveyed by wrapping wheel 6 with a second orientation with respect to direction D2, and wherein large lateral surfaces 9a are substantially perpendicular to direction D2. When transferred from conveyor 4 to wheel 6, group 2 is obviously rotated 90° about its own longitudinal axis (not shown) parallel to the cigarettes forming group 2.

Before being fed through transfer station S2, each seat 5 is fed through a supply station (not shown) where seat 5 receives a sheet 10 of foil wrapping material, which is folded into a U inside seat 5, and in which a respective group 2 is wrapped after being transferred to corresponding seat 5.

Wrapping wheel 6 comprises a cylinder 11 powered to rotate continuously (clockwise in FIG. 1) about a central axis 12 perpendicular to the FIG. 1 plane; and a number of peripheral heads 13 (only one shown) equally spaced about axis 12. Each head 13 defines a respective seat 5 for first receiving and conveying a respective sheet 10 of wrapping material folded substantially into a U, and for subsequently receiving and conveying a respective group 2 of cigarettes, which is wrapped in sheet 10 of wrapping material as the group is fed along path P2.

Each head 13 is hinged to cylinder 11 and is oscillated about an axis 14 parallel to axis 12 by a known cam control device 15 (shown schematically in FIG. 1); and seat 5 of each head 13 is defined by an end wall 16 fitted to head 13, and by two lateral walls 17, which are hinged to opposite ends of wall 16 and are oscillated, by a control device 19 and about respective axes 18 parallel to axis 12, between an open and a closed position.

As shown in FIG. 1, control device 19 comprises a slide 19a supporting end wall 16 and which is moved along head 13, in a direction perpendicular to end wall 16, by a known cam device (not shown); and two ties 19b, each of which is interposed between head 13 and an intermediate point along a respective lateral wall 17, so that each axial movement of slide 19a with respect to head 13 rotates lateral walls 17 about respective axes 18.

In the open position, the two lateral walls 17 of each seat 5 form an obtuse angle with end wall 16, and seat 5 has a section in the form of an isosceles trapezium. In the closed position, the two lateral walls 17 of each seat 5 substantially form a right angle with end wall 16, and seat 5 has a rectangular section of substantially the same size as group 2 so as to engage group 2 completely, i.e. at both central portion 9d and longitudinal ends 9c.

The inner surfaces of walls 16 and 17 comprise a number of holes (not shown) connected to a known suction device (not shown) carried by wrapping wheel 6.

Each head 13 also comprises a known folding device or arm 20, which is hinged to head 13 and oscillated about axis 14 by a known cam device (not shown) to longitudinally fold a projecting portion of a sheet 10 of wrapping material folded into a U about a respective group 2 of cigarettes and housed inside seat 5.

Forming conveyor 4 comprises a known flexible endless toothed belt 21 (shown partly in FIG. 1) fed along path P1 (shown partly in FIG. 1) by pulley 8, which comprises a toothed central roller 22 rotating continuously (anticlockwise in FIG. 1) about a central axis 23 parallel to axis 12.

Loading station S1 is shown schematically in FIG. 1 and, in a first embodiment, is substantially located at the point at which a complete group 2 of cigarettes is fed to a respective seat 3 by a known forming unit not shown. In a further embodiment, conveyor 4 is a forming conveyor for forming groups 2, and loading station S1 is substantially located along a portion of conveyor 4 in which a group 2 of cigarettes is formed layer by layer inside a respective seat 3 by a known hopper-type forming device (not shown) as described for example in U.S. Pat. No. 5,070,991.

Transfer portion P4 of path P1 is located at transfer station S2 and at pulley 8, and extends substantially along an initial portion of a curved portion of path P1 extending about axis 23.

Conveyor 4 also comprises a number of heads 24 (only one shown) carried by and equally spaced along belt 21. As shown more clearly in FIG. 2, each head 24 defines a respective seat 3 having a longitudinal dimension (perpendicular to the FIG. 2 plane) smaller than that of group 2, and having a rectangular section of substantially the same transverse size as group 2, so as to engage group 2 by central portion 9d while leaving respective longitudinal ends 9c substantially free.

Each head 24 is connected to belt 21 in substantially fixed manner by means of two pins 25, which cooperate with respective seats 26 on head 24 to enable head 24 to move slightly with respect to belt 21 to adjust to the curved portions of path P1.

Each head 24 has a retaining device 27 comprising two jaws 28 integral with belt 21 and which oscillate between a gripping position (as shown for example in FIG. 2a) along the straight portions of belt 21, and a release position (as shown for example in FIG. 2c) along the curved portions (only one shown) of belt 21.

In addition to roller 22, pulley 8 comprises two flanges 29 (only one shown) coaxial with axis 23 and supporting, in between, a number of peripheral heads 30 (only one shown in FIG. 1) equally spaced about axis 23 and mounted for rotation about respective axes 31 parallel to axis 23.

Figure 4:
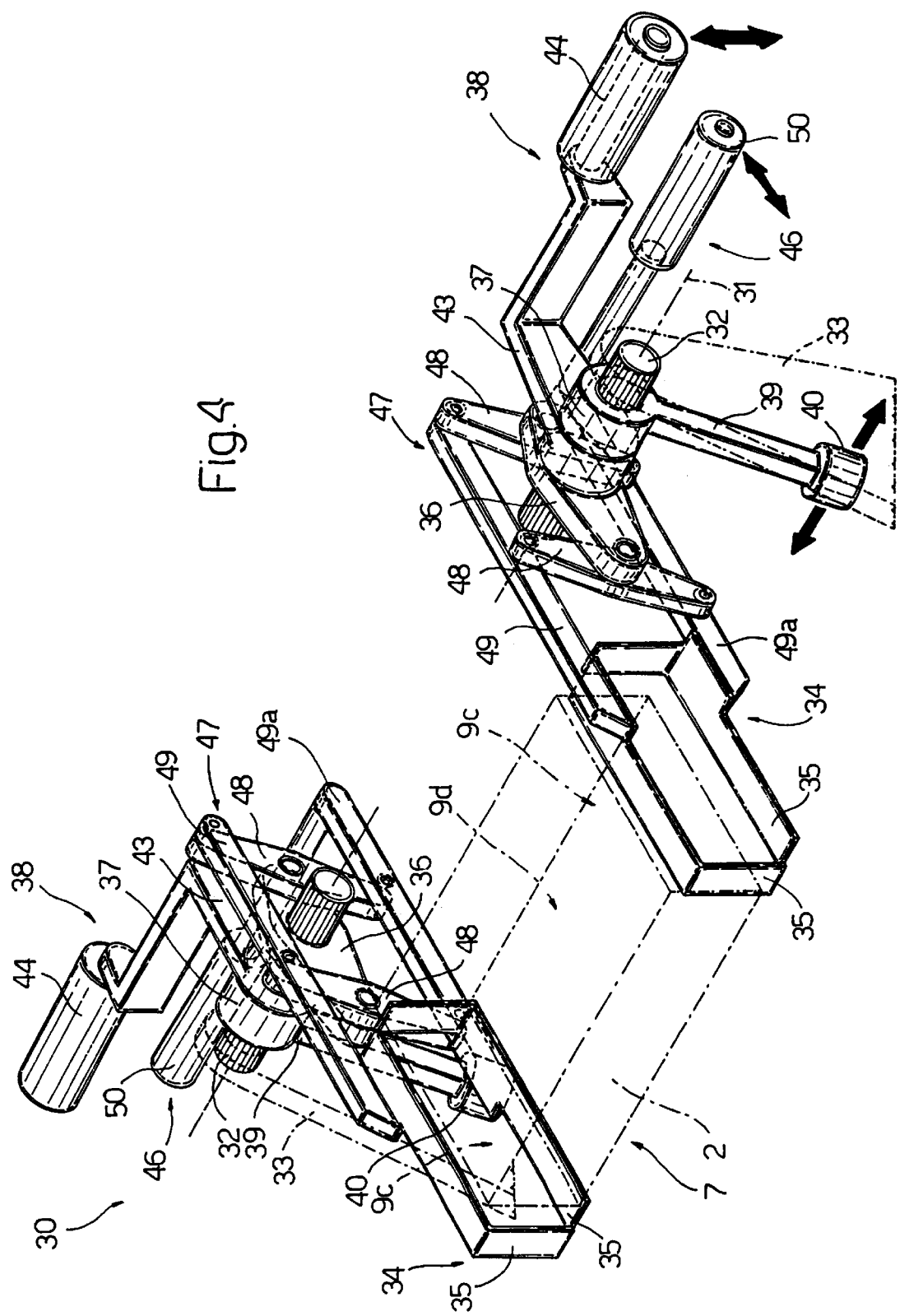
FIG. 4 shows a larger-scale view in perspective of a third detail of the FIG. 1 unit.
Figure 5:
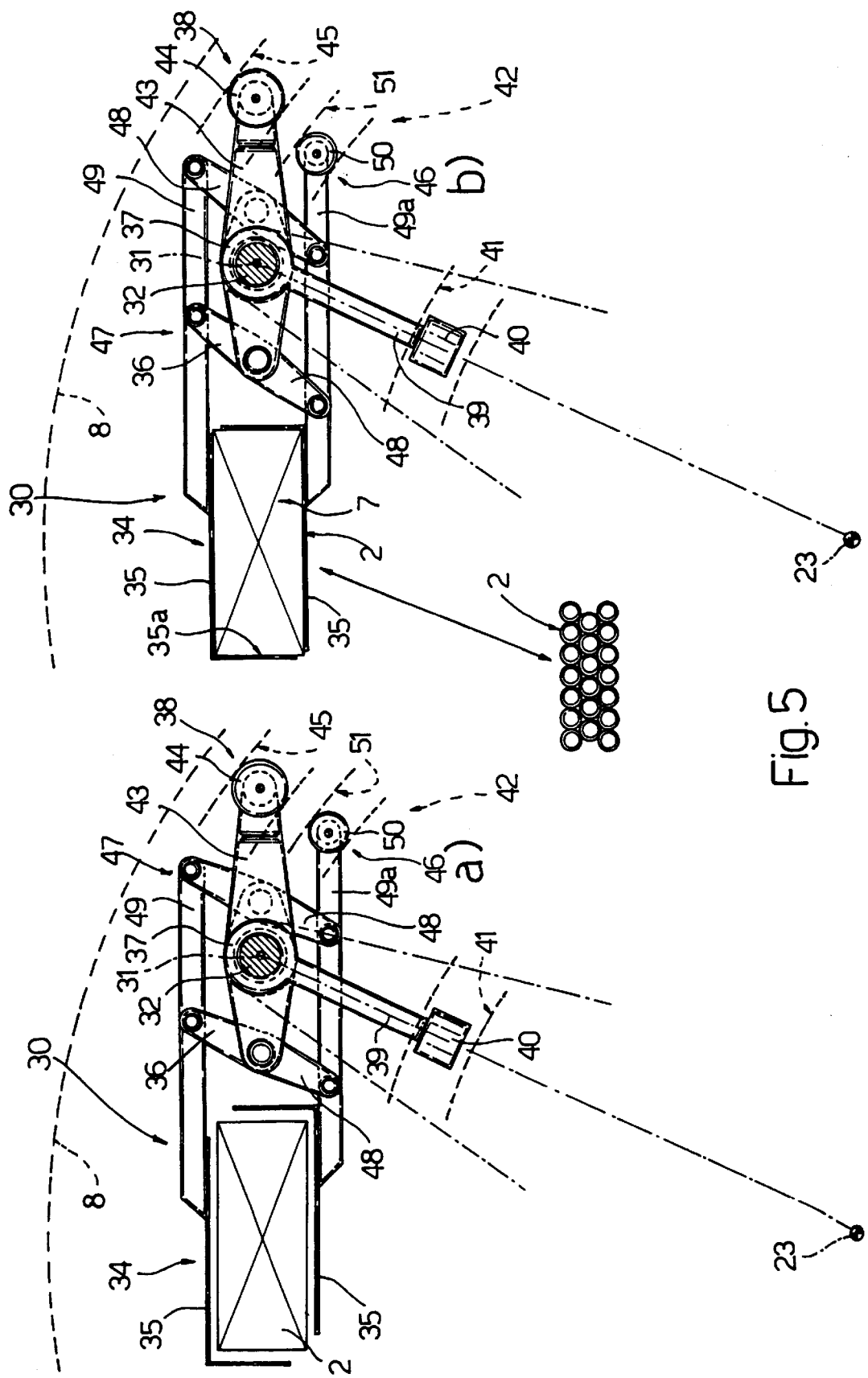
FIG. 5 shows a larger-scale schematic front view of the FIG. 1 detail in different operating positions.

As shown more clearly in FIGS. 4 and 5, each head 30 has a pin 32 coaxial with axis 31 and fitted at opposite ends to two appendixes 33 of respective flanges 29; each head 30 comprises two gripping devices 34, which together define a respective seat 7; and each gripping device 34 comprises two relatively thin L-clamps 35 located in the same plane perpendicular to axis 31, and movable, with respect to each other and in said plane, between a release position (FIG. 5a) and a gripping position (FIG. 5b) in which clamps 35 define a tubular seat 35a having an axis parallel to axis 31 and a rectangular section of approximately the same size as but no larger than the cross section of a group 2. Each gripping device 34 is fitted to a respective rocker arm 36 hinged about axis 31 by a central sleeve 37 fitted in rotary and axially-sliding manner to respective pin 32.

The angular and axial position of each sleeve 37 is controlled by an actuating and control device 38, which comprises an arm 39 projecting radially from sleeve 37 and fitted on the free end with a tappet roller 40, which rotates about a respective axis perpendicular to axis 31 and engages a track 41 formed in a fixed cam 42 located between flanges 29 and forming part of device 38. Track 41 extends about axis 23 to control the axial position of sleeve 37 along respective pin 32 alongside variations in the angular position of respective seat 7 about axis 23.

Actuating and control device 38 also comprises, for each sleeve 37, an arm 43 projecting radially from sleeve 37; and a tappet roller 44 fitted to the free end of arm 43 to rotate, about a respective axis parallel to axis 31, along a respective track 45 formed on cam 42 and extending about axis 23 to control the angular position of sleeve 37 about axis 31 of respective pin 32 alongside variations in the angular position of respective seat 7 about axis 23.

Each gripping device 34 also has an actuating device 46 comprising an articulated parallelogram 47, which in turn comprises two parallel rods 48 hinged to rocker arm 36, and two parallel rods 49, each fitted at one end with a respective L-clamp 35 of gripping device 34. One of the two rods 49, indicated 49a, is fitted, on the opposite end to that supporting respective clamp 35, with a tappet roller 50 mounted for rotation, about a respective axis parallel to axis 31, along a respective track 51 formed on cam 42 and extending about axis 23 to control the axial position of rod 49a with respect to respective pin 32 alongside variations in the angular position of respective seat about axis 23.

Track 41 of cam 42 is so formed that, as pulley 8 rotates about axis 23, the two rocker arms 36 of each seat 7 are moved, along axis 31 of respective pin 32, between an open position of respective gripping device 34—wherein the two tubular seats 35a are separated by a distance greater than the length of a respective group 2 of cigarettes—and a closed position of respective gripping device 34—wherein the two tubular seats 35a define respective seat 7 and grip and retain a respective group 2 of cigarettes by engaging ends 9c of group 2.

Track 45 of cam 42 is so formed that, as pulley 8 rotates about axis 23, the two rocker arms 36 of seat 7 are rotated, about axis 31 of respective pin 32, between a loading position—wherein seat 7 coincides with a respective seat 3 to remove a group 2 of cigarettes from seat 3—and an unloading position—wherein seat 7 coincides with a respective seat 5 to transfer group 2 to seat 5.

Track 51 of cam 42 is so formed that, as pulley 8 rotates about axis 23, rod 49a is moved, with respect to respective pin 32, to deform articulated parallelogram 47 and move clamps 35 between said gripping and release positions.

Operation of unit 1 will be described with reference to one group 2 of cigarettes, and as of when group 2 arrives at station S1.

Belt 21 moves continuously to feed seat 3 and respective group 2 of cigarettes along path P1, first along loading portion P3 and then along transfer portion P4 at transfer station S2.

As shown more clearly in FIG. 2, as seat 3 is fed by conveyor 4 along transfer portion P4, gripping devices 34 of a corresponding seat 7 are set by control devices 38 and 46 to said open and release positions (FIG. 2a). Control device 38 then swings seat 7 about respective axis 31 to assume and maintain for a given length of time a position substantially coincident with seat 3 (FIG. 2b) and wherein control devices 38 and 46 set gripping devices 34 of seat 7 to said closed and gripping positions to grip group 2. At the same time, the curvature of transfer portion P4 moves retaining device 27 of seat 3 into said release position to leave group 2 under the control of seat 7 (FIG. 2c).

At this point, seat 7 is rotated about respective axis 31 to extract group 2 from seat 3 (FIG. 2d) and feed the group towards a corresponding seat 5, which, as wrapping wheel 6 rotates continuously, is being fed through transfer station S2 (FIG. 1) with lateral walls 17 in said open position, and with a U-folded sheet 10 of wrapping material housed and retained inside by said suction device (not shown).

As shown more clearly in FIG. 3, in the neighbourhood of transfer station S2, seat 7 and corresponding seat 5 are swung about respective axes 31 and 14 by respective control devices 38 and 15 to assume and maintain for a given length of time a substantially mutually coincident position (FIG. 3a), whereupon control device 19 moves lateral walls 17 of seat 5 into said closed position to grip group 2 and at the same time finish-fold sheet 10 of wrapping material into a U about group 2 (FIG. 3b).

In the FIG. 3b position, seat 5, with sheet 10 of wrapping material in between, engages both group 2 and clamps 35 of gripping devices 34 of seat 7, which is made possible by the thinness of clamps 35.

Once group 2 is gripped by seat 5, control device 38 moves gripping devices 34 of seat 7 into said open position, so that clamps 35, though still in said gripping position, are withdrawn longitudinally with respect to group 2 to release group 2.

At this point, seats 5 and 7 move out of said mutually coincident position, and control device 38 restores seat 7 to the initial position. At the same time, folding device 20 of seat 5 is activated to longitudinally fold sheet 10 of wrapping material about group 2, and wrapping wheel 6 rotates continuously to fed seat 5 through successive known folding stations (not shown).

In a further embodiment not shown, seats 7 are carried by forming conveyor 4 itself, and each seat 3 is assigned a respective seat 7 fitted to conveyor 4 and adjacent to seat 3.

In a further embodiment shown in FIG. 6, seats 3 on forming conveyor 4 are as described in European Patent Application No. 812,765, and each engage the longitudinal ends of a respective group 2 of cigarettes; seats 3 are carried by respective forks 52 fitted to belt 21 so as to rotate about respective axes 31 parallel to axis 23 of pulley 8; and, along transfer portion P4, a known cam control device (not shown) rotates each seat 3 about respective axis 31 to transfer respective group 2 to a corresponding seat 5 in exactly the same way as described for seats 7.

What is claimed is:

1. A method of transferring a group of cigarettes continuously between conveyors, the method comprising a conveying step wherein said group (2) is fed, by means of a first conveyor (4) traveling continuously in a first direction (D1), along a first path (P1) comprising an initial straight loading portion (P3) and final transfer portion (P4); and a transfer step wherein said group (2) is transferred, as the group (2) travels along said transfer portion (P4), from said first conveyor (4) to a second conveyor (6) traveling Continuously in a second direction (D2) along a second path (P2);

wherein said first path (P1) and said second path (P2) are coplanar and are spaced apart one from the other and said first direction (D1) is not parallel to said second direction (D2) during the transfer of the group (2); said transfer step being performed by housing the group (2), at least as the group is fed along said transfer portion (P4), inside a movable seat (7; 3), which is fed by said first conveyor (4) at least along said transfer portion (P4), and is simultaneously moved, with respect to said first conveyor (4) and said transfer portion (P4) and as the movable said first path (P1) and a second position along said second path (P2), so as to effect a rotation of said group (2) with respect to the first and second paths (P1, P2) to enable the group (2) to travel along said straight loading portion (P3) and said second path (P2) with two respective different orientations with respect to said first direction (D1) and said second direction (D2) respectively; said two orientations being substantially at 90° to each other.

2. A method as claimed in claim 1, wherein said first conveyor (4) and said second conveyor (6) comprise a first seat (3) and a second seat (5) respectively for said group (2); said movable seat (7; 3) being said first seat (3), which is fed along said, loading portion (P3) in a substantially fixed position with respect to said first conveyor (4), and is moved, along said transfer portion (P4), with respect to the first conveyor (4) to transfer the group (2) to the second seat (5).

3. A method as claimed in claim 1, wherein said first conveyor (4) and said second conveyor (6) comprise a first seat (3) and a second seat (5) respectively for said group (2); said movable seat (7; 3) being a third seat (7), which is fed along said transfer portion (P4) to engage said group (2) housed inside the first seat (3), and is moved with respect to the first seat (3) to remove the group (2) from the first seat (3) and transfer the group (2) to the second seat (5).

4. A method as claimed in claim 2, wherein said second conveyor (6) is a wrapping conveyor; said second seat (5) housing a sheet (10) of wrapping material folded substantially into a U; and said sheet (10) of wrapping material being fed to said second seat (5) before said group (2) is transferred to the second seat (5).

5. A method as claimed in claim 4, wherein said second seat (5) is defined by an end wall (16), and by two lateral walls (17) movable between an open first position and a closed second position; said two lateral walls (17) being maintained in said first position during transfer of said group (2), and being moved into said second position to hold together said sheet (10) of wrapping material and said group (2).

6. A method as claimed in claim 3, wherein said third seat (7) is fed along said transfer portion (P4) at a speed substantially equal to the traveling speed of said first seat (3).

7. A method as claimed in claim 1, wherein said rotation is effected by rotating the group (2) about a first axis (31) movable with the first conveyor (4) along said transfer portion (P4).

8. A method as claimed in claim 7, wherein said group (2) is rotated about said first axis (31) by rotating said movable seat (7; 3) about the first axis (31).

9. A method as claimed in claim 1, wherein said group (2) is elongated and comprises two opposite longitudinal ends (9c) and a central portion (9d) interposed between said two longitudinal ends (9c); said movable seat (7; 3) engaging the group (2) by said longitudinal ends (9c).

10. A method as claimed in claim 3, wherein said first seat (3) engages the group (2) by said central portion (9d).

11. A method as claimed in claim 3, wherein said second seat (5) engages the group (2) by said central portion (9d) and said longitudinal ends (9c).

12. A unit for transferring a group of cigarettes continuously between conveyors, the unit comprising a first conveyor (4) for feeding said group (2) continuously and in a first direction (D1) along a first path (P1) comprising an initial straight loading portion (P3) and a final transfer portion (P4); a second conveyor (6) for feeding said group (2) continuously and in a second direction (D2) along a second path (P2); and transfer means (30) acting along said transfer portion (P4) to transfer said group (2) from the first conveyor (4) to the second conveyor (6); wherein said first path (P1) and said second path (P2) are coplanar and are spaced apart one from the other and said first direction (D1) is not parallel to said second direction (D2) during the transfer of the group (2); said transfer means (30) comprising a movable seat (7; 3) For housing the group (2) and which is fed by said first conveyor (4) at least along said transfer portion (P4); and actuating means (38) for moving said movable seat (7; 3), with respect to the first conveyor (4) and as the movable seat (7; 3) is fed along said transfer portion (P4), between a first position along said first path (P1) and a second position along said second path (P2) to effect a rotation of said group (2) with respect to the to the first and second paths (P1, P2) to enable the group (2) to travel along said straight loading portion (P3) and said second path (P2) with two respective different orientations with respect to said first direction (D1) and said second direction (D2) respectively; said two orientations being substantially at 90° to each other.

13. A unit as claimed in claim 12, wherein said first conveyor (4) and said second conveyor (6) comprise a first seat (3) and a second seat (5) respectively for said group (2); said movable seat (7; 3) being defined by said first seat (3).

14. A unit as claimed in claim 12, wherein said first conveyor (4) and said second conveyor (6) comprise a first seat (3) and a second seat (5) respectively for said group (2); said first conveyor (4) also comprising a third seat (7) defining said movable seat (7; 3).

15. A unit as claimed in claim 13, wherein said first conveyor (4) is an output conveyor of a unit for forming said group (2), and said second conveyor (6) is a wrapping wheel.

16. A unit as claimed in claim 13, wherein second seat (5) is fitted in rotary manner to said second conveyor (6) to rotate about a first axis (14) movable with the second conveyor (6); said second conveyor (6) comprising a first control device (15) for controlling the angular position of said second seat (5) about said first axis (14).

17. A unit as claimed in claim 16, including two lateral walls (17) movable, with respect to each other, between an open first position and a closed second position; and a second control device (19) for maintaining said two lateral walls (17) in said first position during transfer of said group (2), and for moving said two lateral walls (17) into said second position to retain the group (2) inside the second seat.

18. A unit as claimed in claim 12, wherein said movable seat (7; 3) is fitted to said first conveyor (4) to rotate about a second axis (31); said actuating means (38) controlling the angular position of the movable seat (7; 3) about the second axis (31).

19. A unit as claimed in claim 14, wherein said first seat (3) is fixed with respect to said first conveyor (4).

20. A unit as claimed in claim 14, wherein said third seat (7) is defined by two opposite tubular seats (35a), which engage respective longitudinal ends (9c) of said group (2), and are mounted for rotation about said second axis (31).

21. A unit as claimed in claim 20, wherein said tubular seats (35a) are so mounted as to slide, in a third direction parallel to said second axis (31), between an open position and a closed position; said actuating means (38) controlling the position of said tubular seats (35a) in said third direction and between said open position and said closed position.

22. A unit as claimed in claim 21, wherein each said tubular seat (35a) is defined by a respective gripping device (34) comprising two L-shaped clamps (35) movable with respect to each other between a gripping position, in which the clamps (35) are substantially joined to each other to define the respective tubular seat (35a), and a release position, in which the clamps (35) are separated by a given distance; said transfer means (30) comprising a third control device (46) for controlling the position, between said release position and said gripping position, of each of said clamps (35) with respect to the corresponding other clamp (35).

* * * * *